United States Patent [19]
Hawthorn et al.

[11] Patent Number: 5,423,273
[45] Date of Patent: Jun. 13, 1995

[54] SINGLE SEAM CUBE SHAPED RESTRAINT CUSHION

[75] Inventors: Laura A. Hawthorn, Vandalia; James L. Webber, Spring Valley; James K. Conlee, Dayton; Jeffrey L. Makley, Tipp City, all of Ohio

[73] Assignee: General Motors Corporation, Detroit, Mich.

[21] Appl. No.: 189,979

[22] Filed: Feb. 1, 1994

[51] Int. Cl.[6] .................... D05B 13/00; B65D 30/10; B60R 21/16
[52] U.S. Cl. ........................ 112/441; 112/10; 280/743.1
[58] Field of Search .............. 112/2.1, 10, 11, 114, 112/440, 441, 423, 426; 280/728 R, 743 R, 743 A; 2/248; 383/4, 87; 150/128

[56] References Cited

U.S. PATENT DOCUMENTS

| | | | |
|---|---|---|---|
| 3,990,726 | 11/1976 | Oka et al. | 280/743 R X |
| 4,213,634 | 7/1980 | Hoshino | 280/728 R |
| 4,838,186 | 6/1989 | Resta et al. | 112/2.1 |
| 5,100,168 | 3/1992 | Horiuchi et al. | 280/728 R |
| 5,114,180 | 5/1992 | Kami et al. | 280/743 R |
| 5,141,787 | 8/1992 | Yamamoto | 112/441 X |
| 5,277,966 | 1/1994 | Nakayama et al. | 280/728 R X |

FOREIGN PATENT DOCUMENTS

| | | | |
|---|---|---|---|
| 0479185 | 4/1992 | European Pat. Off. | 280/743 A |
| 2944319 | 5/1987 | Germany | 280/743 A |
| 4009611 | 10/1991 | Germany | 280/728 R |

*Primary Examiner*—Clifford D. Crowder
*Assistant Examiner*—Ismael Izaguirre
*Attorney, Agent, or Firm*—Charles E. Leahy

[57] ABSTRACT

A restraint cushion is comprised of first and second fabric panels. Each of the two fabric panels is folded and interleaved with the other to form the restraint cushion. A single continuous seam interconnects the mating edges of the two panels. The restraint cushion has a generally cubic shape defined by top, bottom, forward, rearward, left, and right side. Each of the two fabric panels is a generally elongate continuous strip folded to a U-shape and interleaved with the other to form the cubic shape of the restraint cushion. The restraint cushion minimizes the number of panels used in forming the restraint cushion and minimizes the number of seams sewn to interconnect the panels so that the assembly costs of the restraint cushion are reduced.

6 Claims, 3 Drawing Sheets

SINGLE SEAM CUBE SHAPED RESTRAINT CUSHION

The invention relates to an air bag restraint system, and more particularly to an improved restraint cushion comprised of two fabric panels and a single continuous seam sewn to interconnect the mating edges of the two panels.

BACKGROUND OF THE INVENTION

It is well known in motor vehicles to provide an air bag restraint system for protection of a vehicle occupant. The air bag restraint system includes a restraint cushion which is rapidly inflated by discharging gas from an inflator when the vehicle experiences a predetermined rate of deceleration.

Restraint cushions are typically comprised of several fabric panels sewn together along mating edges. For example, the prior art discloses restraint cushions having one or two main panels and two end panels joined together by sewing several seams to form the restraint cushion. The prior art also discloses pillow shaped restraint cushions having one or more panels joined together by sewing at least two seams.

Each additional seam that is sewn and each additional panel that is used in forming the restraint cushion increases the assembly cost of the restraint cushion.

Thus, it would be desirable to provide an improved restraint cushion which minimizes the number of panels used in forming the restraint cushion and which minimizes the number of seams sewn to interconnect the panels so that the assembly costs of the restraint cushion are reduced.

SUMMARY OF THE INVENTION

According to the invention, a restraint cushion is comprised of first and second fabric panels. Each of the two fabric panels is folded and interleaved with the other to form the restraint cushion. A single continuous seam interconnects the mating edges of the two panels.

In accordance with another aspect of the invention, the restraint cushion has a generally cubic shape defined by top, bottom, forward, rearward, left, and right sides. Each of the two fabric panels is a generally elongate continuous strip folded to a U-shape and interleaved with the other to form the cubic shape of the restraint cushion. In addition, at least one of the fabric panels includes a continuous edge margin extending from its mating edges.

Accordingly, it is an object feature and advantage of this invention to provide a simplified restraint cushion which minimizes the number of panels used in forming the restraint cushion and which minimizes the number of seams sewn to interconnect the panels so that the assembly costs of the restraint cushion are reduced.

BRIEF DESCRIPTION OF THE DRAWINGS

These and other features, objects, and advantages of the present invention will become apparent upon consideration of the following description of the preferred embodiment, appended claims, and accompanying drawings in which:

DESCRIPTION OF THE PREFERRED EMBODIMENT

Figure 1:
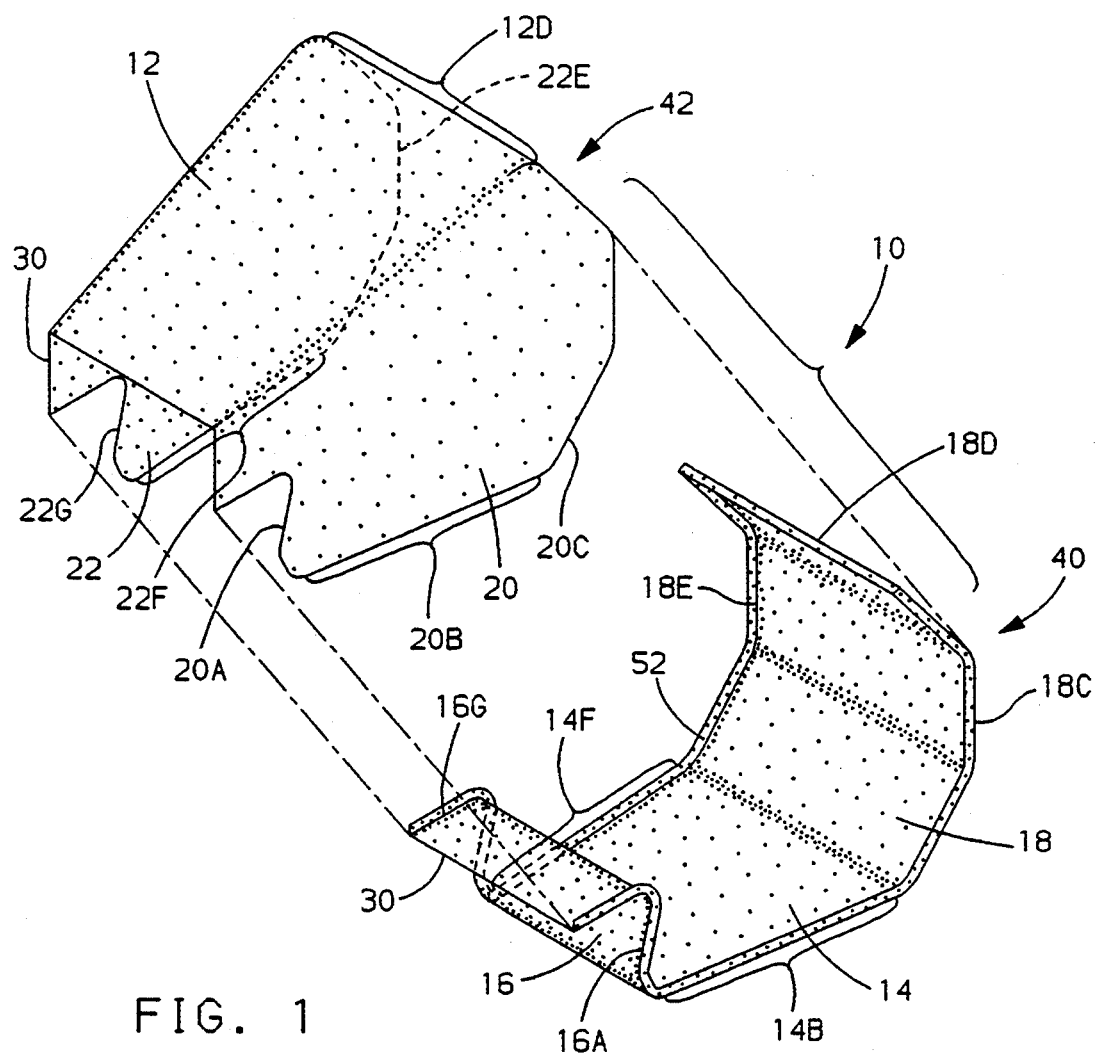
FIG. 1 is an exploded perspective view of a restraint cushion.
Figure 2:
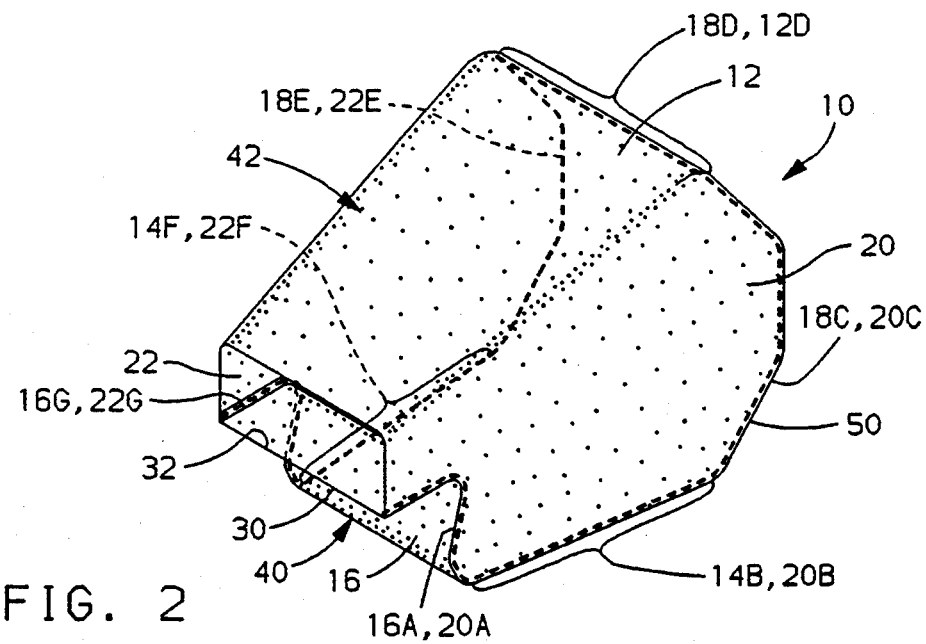
FIG. 2 is a perspective view of the restraint cushion in the assembled condition.

FIGS. 1 and 2 illustrate a restraint cushion 10 for use in an air bag restraint system of a motor vehicle. The cushion 10 is generally cube shaped and includes a top side portion 12, a bottom side portion 14, a forward side portion 16, a rearward side portion 18, a left side portion 20, and a right side portion 22. The rearward side portion 18 of the cushion 10 opposes a vehicle occupant to be restrained when the cushion 10 is in the inflated condition as shown in FIG. 2.

As best shown in FIG. 2, the cushion 10 also includes a forward mouth portion 30 having a generally rectangular cushion opening 32 defined by the left side portion 20, the right side portion 22, the top side portion 12 and the forward side portion 16 of the cushion 10. The mouth portion 30 of the cushion 10 may be secured to the air bag restraint system in a conventional manner. The cushion opening 32 is adjacent the top side portion 12 of the cushion 10 to provide a top-mount cushion 10.

FIG. 2 shows the cushion 10 in the inflated condition. The cushion 10 is normally stored in a folded condition within the air bag restraint system. Upon the vehicle experiencing a predetermined rate of deceleration, an inflator (not shown) discharges gas into the cushion opening 32 to inflate the cushion 10.

Figure 3:
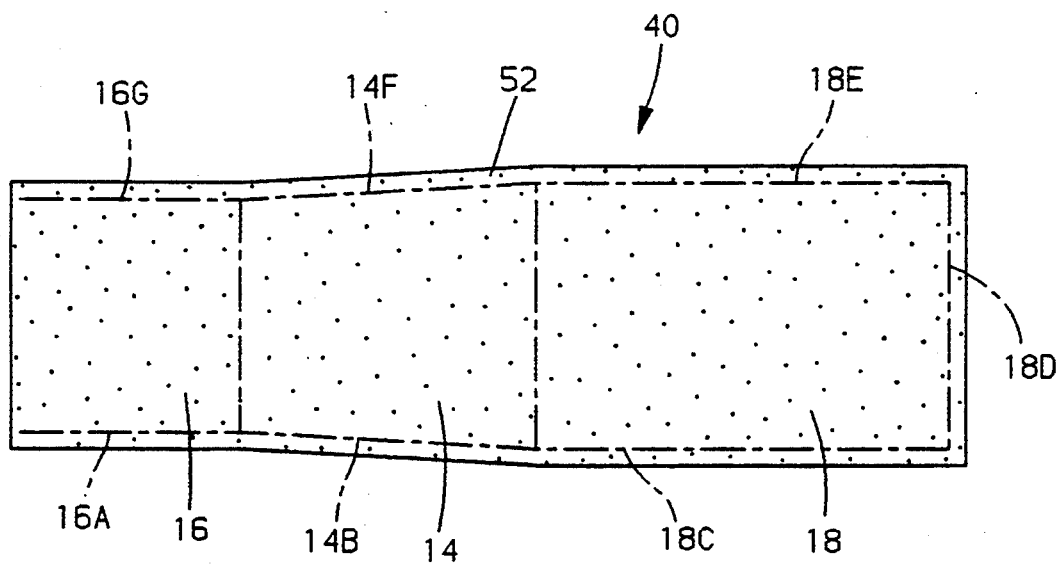
FIG. 3 is plan view of a first panel of the restraint cushion.
Figure 4:
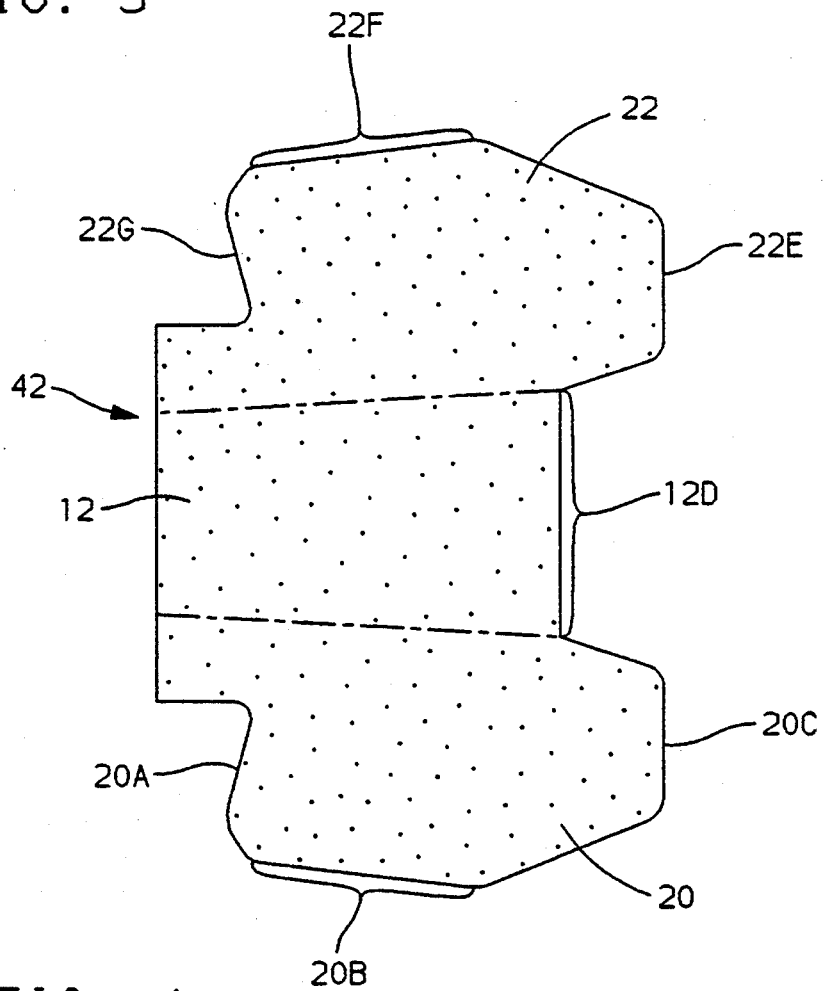
FIG. 4 is a plan view of a second panel of the restraint cushion.

Referring to FIGS. 3 and 4, the cushion 10 is comprised of a first fabric panel 40 and a second fabric panel 42. Each of the panels 40, 42 is made of a conventional cushion material. The first fabric panel 40, shown in FIG. 3, is a flat, generally elongate continuous strip including the bottom side portion 14 interposed between the forward side portion 16 and the rearward side portion 18. The second fabric panel 42, shown in FIG. 4, is a flat, generally elongate continuous strip including the top side portion 12 interposed between the left side portion 20 and the right side portion 22.

The first panel 40 and second panel 42 are shaped such that when each of the two panels 40, 42 is folded to a generally U-shaped section as shown in FIG. 1, the panels 40, 42 may be interleaved with each other to form the three-dimensional cubic shape of the cushion 10 as shown in FIG. 2.

As best shown in FIG. 3, the first panel 40 includes a first forward panel edge 16A, a first bottom panel edge 14B, a first rearward panel edge 18C, a second rearward panel edge 18D, a third rearward panel edge 18E, a second bottom panel edge 14F, and a second forward panel edge 16G. As best shown in FIG. 4, the second panel 42 includes a first left side panel edge 20A, a second left side panel edge 20B, a third left side panel edge 20C, a top panel edge 12D, a first right side panel edge 22E, a second right side panel edge 22F, and a third right side panel edge 22G.

As best shown in FIG. 1, panel edges 16A, 14B, 18C, 18D, 18E, 14F, and 16G of the first panel 40 correspond for matably interconnecting with panel edges 20A, 20B, 20C, 12D, 22E, 22F, and 22G of the second panel 42, as further described below.

As best shown in FIG. 3, a continuous fabric edge margin 52 extends outwardly from the mating panel edges 16A, 14B, 18C, 18D, 18E, 14F, 16G of the first panel 40. As shown in FIG. 1, the edge margin 52 is folded inwardly to provide a continuous fabric surface along which the first and second panels 40, 42 may be easily be sewn together during cushion 10 assembly.

During assembly of the cushion 10, the first panel 40 and second panel 42 are interleaved to form the generally cubic shape of the cushion 10 shown in FIG. 2. The cushion 10 includes generally spaced apart opposed top and bottom side portions 12, 14, spaced apart opposed forward and rearward side portions, 16, 18, and spaced apart opposed left and right side portions 20, 22.

As shown in FIG. 2, the cushion 10 includes a single continuous seam 50 sewn to interconnect the mating panel edges 16A, 14B, 18C, 18D, 18E, 14F, 16G of the first fabric 40 with the corresponding mating panel edges 20A, 20B, 20C, 12D, 22E, 22F, 22G of the second fabric panel 42. During cushion 10 assembly, the single continuous seam 50 of the cushion 10 is continuously sewn in the following order: the first forward panel edge 16A is sewn to the first left side panel edge 20A, the first bottom panel edge 14B is sewn to the second left side panel edge 20B, the first rearward panel edge 18C is sewn to the third left side panel edge 20C, the second rearward panel edge 18D is sewn to the top panel edge 12D, the third rearward panel edge 18E is sewn to the first right side panel edge 22E, the second bottom panel edge 14F is sewn to the second right side panel edge 22F, and the second forward panel edge 16G is sewn to the third right side panel edge 22G.

It will be appreciated that the single continuous seam 50 may also be continuously sewn in the reverse order. It will further be appreciated that the single continuous seam 50 may be continuously sewn in the forward and reverse orders to interconnect the panels 40, 42 by multiple rows of stitching, if desired.

Thus, it is seen that the invention provides a simplified cushion 10 which requires only two panels 40, 42 and a single continuous seam 50 sewn to interconnect the two panels 40, 42, thereby minimizing the number of panels used in forming the cushion and minimizing the number of seams sewn to interconnect the panels so that the assembly costs of the cushion are reduced.

Although the present invention has been described in considerable detail with reference to the preferred embodiment of FIGS. 1 through 4, many other versions are possible within the scope and intent of the claims.

Figure 5:
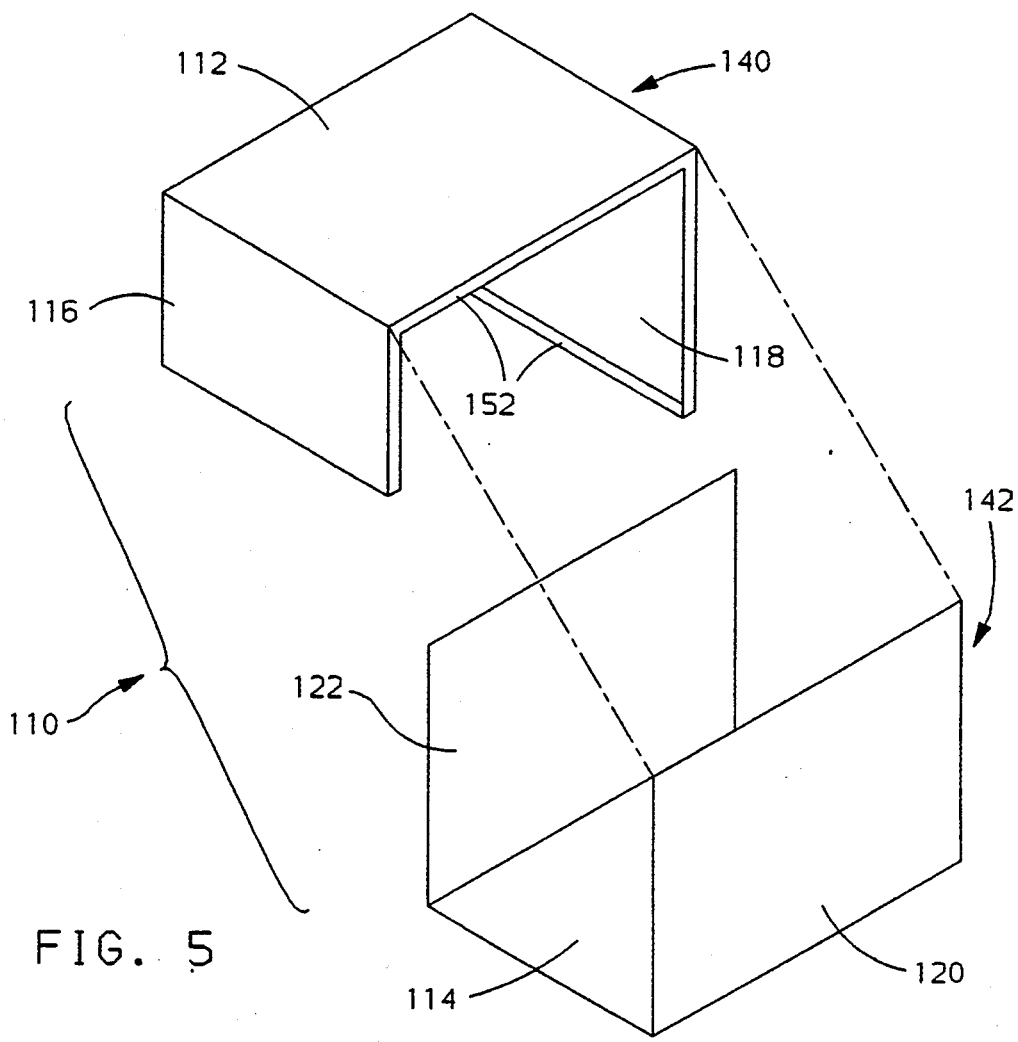
FIG. 5 is a schematic drawing of a view similar to FIG. 1, but showing an alternate embodiment of the present invention.
Figure 6:
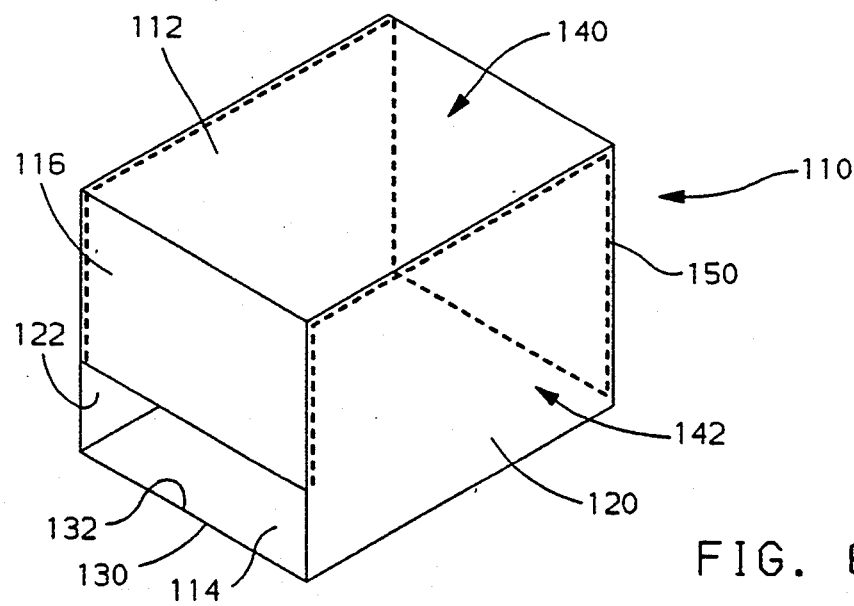
FIG. 6 is a schematic drawing of a view similar to FIG. 2, but showing the alternate embodiment of FIG. 5.

For example, FIGS. 5 and 6 show an alternate embodiment of this invention. As shown in FIG. 5, the cushion 110 is comprised of a first fabric panel 140 and a second fabric panel 142. The first fabric panel 140 is a flat, generally elongate continuous strip including a bottom side portion 114 interposed between a left side portion 120 and a right side portion 122. The first fabric panel also includes a continuous edge margin 152. The second fabric panel 142 is a flat, generally elongate continuous strip including a top side portion 112 interposed between a forward side portion 116 and a rearward side portion 118. The cushion 110 includes a mouth portion 130 having a cushion opening 132. The cushion opening 132 is adjacent the bottom side portion 114 of the cushion 110 to provide a low-mount cushion 110.

The first panel 140 and second panel 142 are shaped such that when each of the two panels 140, 142 is folded to a generally U-shaped section as shown in FIG. 5, the panels 140, 142 may be interleaved with each other to form the generally cubic shape of the cushion 110. A single continuous seam 150 is sewn to interconnect the mating edges of the two panels 140, 142 as shown in FIG. 6.

It will be understood that a person skilled in the art may make modifications to the preferred embodiment shown herein within the scope and intent of the claims. For example, although the preferred embodiment describes a single continuous seam 50 which is preferably continuously sewn to minimize sewing operations, the single continuous seam 50 does not necessarily need to also be continuously sewn. As another example, although the preferred embodiment provides a cushion 10 in which the mouth portion 30 is located adjacent the top side portion 12 of the cushion 10 to form a top-mount cushion, it will be appreciated that the two panels 40, 42 can be appropriately cut and folded to alternatively position the mouth portion 30 to create a mid-mount cushion or low-mount cushion. Although the preferred embodiment shows the mouth portion 30 as an integral part of the cushion 10, it will be understood that the mouth portion may also be included as a separate piece sewn to the cushion 10, with additional sewing operations if desired. Thus, it will be appreciated that the two fabric panels interconnected by a single continuous seam need only form the main cube shaped portion of the cushion. In addition, it will be appreciated that the continuous edge margin 52 which is provided on the first panel 40 in the preferred embodiment, may alternatively be provided on the second panel 42 or both panels. It will further be appreciated that although the fabric edge margin 52 is continuous as shown in the preferred embodiment, the fabric edge margin may also be discontinuous as long as a single continuous seam is still provided. Furthermore, internal tethers may be added to the cushion with additional sewing operations, if desired.

While the present invention has been described as carried out in specific embodiments thereof, it is not intended to be limited thereby but is intended to cover the invention broadly within the scope and spirit of the appended claims.

The embodiments of the invention in which an exclusive property or privilege is claimed are defined as follows:

1. A generally cube shaped restraint cushion having spaced apart opposed top and bottom sides, spaced apart opposed forward and rearward sides, and spaced apart opposed left and right sides, the restraint cushion comprising:

first and second fabric panels, each of the two fabric panels being a generally elongate continuous strip folded to a U-shape and interleaved with the other to define mating edges on each of the two fabric panels and to form the entire cube shape of the restraint cushion;

the restraint cushion having an opening cooperatively defined by the two folded fabric panels; and a single seam having a first end starting adjacent the opening, being contiguous with the mating edges of the two fabric panels, and having a second end terminating adjacent the opening, the single seam being continuous between the first and second ends and the single seam being sewn to interconnect the mating edges of the two fabric panels.

2. The restraint cushion of claim 1 further characterized by at least one of the fabric panels having a continuous edge margin extending from its mating edges.

3. A generally cube shaped restraint cushion comprising:
- a first fabric panel being a generally elongate continuous strip including a bottom panel portion interposed between a forward panel portion and a rearward panel portion
- a second fabric panel being a generally elongate continuous strip including a top panel portion interposed between a left panel portion and a right panel portion;
- the restraint cushion having an opening cooperatively defined by the top, forward, left and right panel portions;
- each of the panels being folded to a U-shape and interleaved with the other panel to define mating edges on each of the panels and to form the entire cube shape of the restraint cushion including the opening; and
- a single seam having two ends adjacent the opening, the single seam being continuous between the two ends and sewn to interconnect the mating edges of the panels.

4. The restraint cushion of claim 3 further characterized by at least one of the fabric panels having an edge margin extending from its mating edges.

5. A generally cube shaped restraint cushion comprising:
- a first fabric panel being a generally elongate continuous strip including a bottom panel portion interposed between a left panel portion and a right panel portion
- a second fabric panel being a generally elongate continuous strip including a top panel portion interposed between a forward panel portion and a rearward panel portion
- the restraint cushion having an opening cooperatively defined by the forward, bottom, left, and right panel portions;
- each of the panels being folded to a U-shape and interleaved with the other panel to define mating edges on each of the panels and to form the entire cube shape of the restraint cushion including the opening; and
- a single seam having two ends adjacent the opening, the single seam being continuous between the two ends and sewn to interconnect the mating edges of the panels.

6. The restraint cushion of claim 5 further characterized by at least one of the fabric panels having an edge margin extending from its mating edges.

* * * * *